Feb. 22, 1966 YOSHIYUKI NAKANO 3,237,108

DIODE GATING CIRCUIT FOR TURBINE CONTROL

Filed June 25, 1963 2 Sheets-Sheet 1

INVENTOR
YOSHIYUKI NAKANO
BY Paul M. Craig, Jr.
ATTORNEY

Feb. 22, 1966 YOSHIYUKI NAKANO 3,237,108

DIODE GATING CIRCUIT FOR TURBINE CONTROL

Filed June 25, 1963 2 Sheets-Sheet 2

INVENTOR
YOSHIYUKI NAKANO
BY Paul M. Craig, Jr.
ATTORNEY

United States Patent Office 3,237,108
Patented Feb. 22, 1966

3,237,108

DIODE GATING CIRCUIT FOR TURBINE CONTROL

Yoshiyuki Nakano, Hitachi-shi, Japan, assignor to Hitachi, Ltd., Tokyo, Japan, a corporation of Japan Filed June 25, 1963, Ser. No. 290,548
Claims priority, application Japan, June 25, 1962, 37/25,708
7 Claims. (Cl. 328—1)

This invention relates to electric circuit devices for automatic control and has for its object to provide an electric circuit device which is usable in controlling various equipment upon the basis of both a variable amount and its rate of variation and is particularly valuable in controlling the acceleration and deceleration of turbine units. In general, the object of the invention is to provide devices which are useful for controlling equipment to the desired amount of variation at the desired rate of variation.

Figures 1, 2, 3:
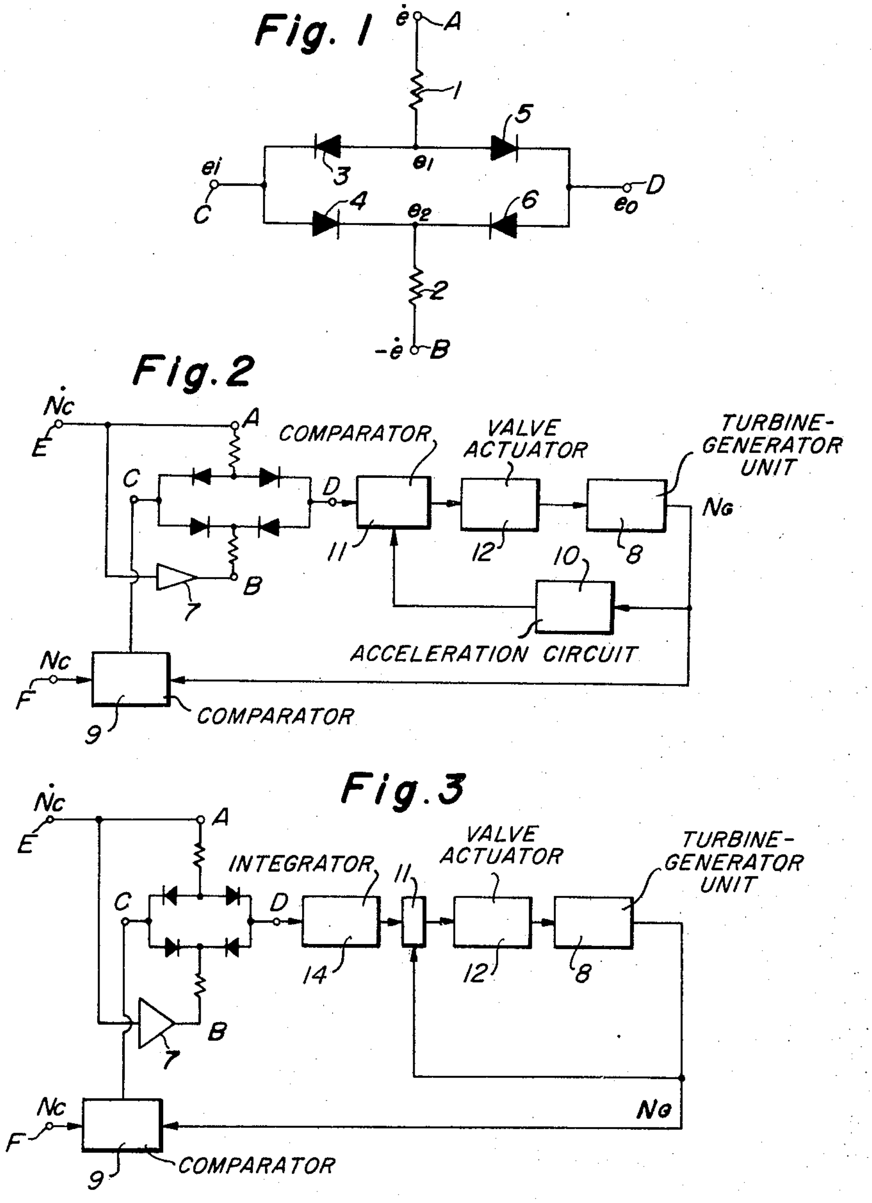
Figure 4:
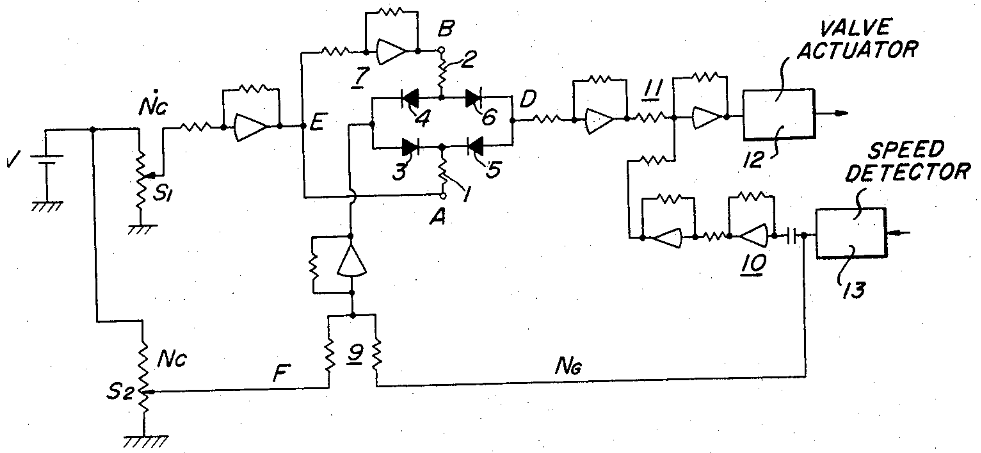
Figure 5:
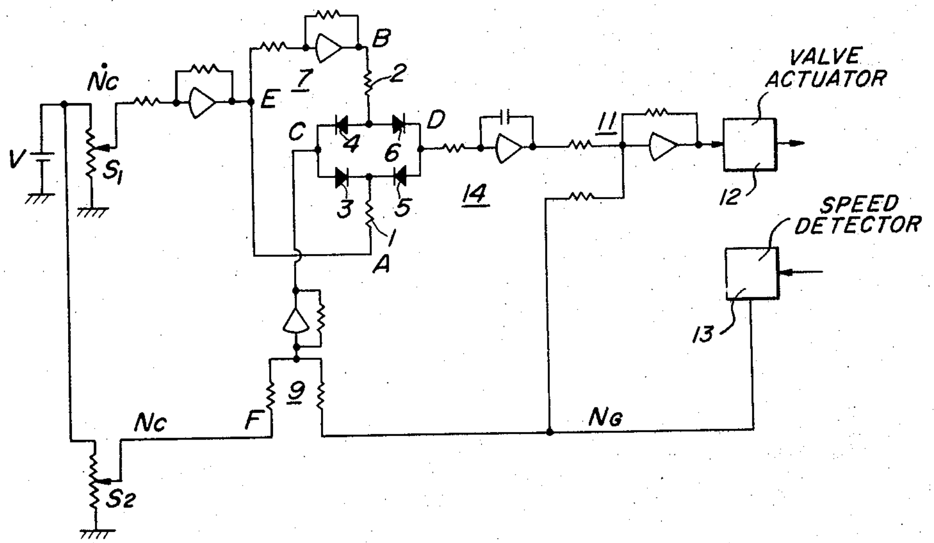

The present invention will now be described with reference to the accompanying drawings, in which:

FIG. 1 is a schematic diagram of the basic circuit of the invention;

FIGS. 2 and 3 are block diagrams of respective automatic control systems incorporating the device of the invention; and FIGS. 4 and 5 are circuit diagrams illustrating the respective control systems of FIGS. 2 and 3 in specific form.

In the drawings, like reference characters indicate like parts throughout the several figures.

Referring first to FIG. 1, the circuit device comprises resistances 1 and 2 and diodes 3, 4, 5 and 6. These elements are connected in a bridge form as shown. Reference characters A, B, C and D indicate respective terminals of the device and auxiliary power sources $\dot{e}$ and $-\dot{e}$ are connected to opposite terminals A and B, respectively, while an input signal $e_i$ is applied to third terminal C. Under these conditions the voltages $e_1$ and $e_2$ appearing at the respective junctions between the pairs of series-connected diodes 3–4 and 5–6 and the one $e_0$ appearing at the terminal D have the following relationships depending upon the polarity and magnitude of the input signal $e_i$.

(1) In case $e_i<-\dot{e}$:

$$e_0=e_2=-\dot{e}$$

(2) In case $-\dot{e}<e_i<\dot{e}$:

$$e_0=e_1=e_2=e_i$$

(3) In case $\dot{e}<e_i$:

$$e_0=e_1=\dot{e}$$

With the present device, it will be observed that, when auxiliary power sources $\dot{e}$ and $-\dot{e}$, having opposite polarities, are applied through respective resistances to two opposite apexes of the bridge formed of four diodes and a control signal is applied to a third apex, a voltage $e_0$ can be obtained which depends upon the value of the input signal as indicated above. Particularly, in the case where $|e_i|>>|e|$, the output voltage obtained is almost invariably expressed by Formula 1 or 3 but not by Formula 2. This means that an output voltage can be obtained with the present device which has a predetermined magnitude independent of the input signal and a polarity corresponding to that of the signal.

It will thus be appreciated that the present device is particularly suitable for use in a looped automatic control system such as shown in FIG. 2 or 3. This will become apparent from the following considerations of the operation of the illustrated embodiments of the invention as designed for turbine-generator units.

In starting or stopping a turbine-generator unit, it is important at all times to accelerate or decelerate the unit at an optimum rate while continuously monitoring the the steam conditions and the turbine operation not only to detect abnormalities but also to see whether the unit is in any of several critical speed ranges out of which the unit must pass before it reaches its rated speed.

If any abnormality be observed, an appropriate measure must be taken, for example, temporary interruption of the acceleration or reduction of the rate of acceleration or deceleration. If the speed of rotation is in any of the critical speed ranges, the rate of acceleration should be increased to pass the range as fast as possible. In the past, human judgment based upon experience had to be resorted to for such atendance, which includes opening or closing the starting valve by degrees. Such manual valve operation requires an extended period of time and involves a substantial danger of misoperation.

These diifficulties previously encountered in the operation of turbine-generator units can be fully overcome by use of an automatic control system incorporating the present device as illustrated in the block diagram of FIG. 2 or 3.

Referring first to FIG. 2, reference numeral 8 indicates a turbine-generator unit to be speed controlled by the automatic control system. The system includes directive terminals E and F to be impressed with a voltage $\dot{N}_c$ corresponding to the desired rate of acceleration and a voltage $N_c$ corresponding to the desired speed to be reached, respectively. The voltage $\dot{N}_c$ is applied directly to one terminal A of the bridge circuit and at the same time to opposite terminal B by way of an invertor 7, which reverses the polarity or sign of the voltage $\dot{N}_c$. A comparator 9 is provided to compare the desired speed of rotation $N_c$ applied to terminal F and to be reached by the unit 8 with its actual speed of rotation $N_g$, and the difference between $N_c$ and $N_g$ is applied to a third terminal C of the bridge circuit as an input signal. Thus, it will be observed that an acceleration signal $\dot{N}_c$ or $-\dot{N}_c$ is obtained at a fourth terminal D depending upon the polarity of the output of the comparator 9. Another comparator 11 is provided for comparison between the acceleration signal and the output of an acceleration circuit 10, which represents the actual rate of acceleration of the turbine-generator unit 8. The output of the second comparator 11 is led to a starting valve actuator 12 for the speed control of the unit 8.

Referring next to FIG. 3, the automatic control system illustrated includes a kind of integrating circuit 14 for forming a speed pattern. The circuit receives the acceleration signal $\dot{N}_c$ (or $-\dot{N}_c$) from the terminal D and converts it into a speed signal, which is compared by comparator 11 with the actual speed $N_G$ of the turbine-generator unit 8. The output of the comparator is applied to a starting valve actuator 12 for the speed control of the unit 8. In this automatic control system, it is to be noted that the acceleration signal can be compared directly with the generator speed $N_G$ by comparator 11 since the acceleration signal is preliminarily converted into a speed pattern.

As apparent from the foregoing description, it is possible by use of the present device to automatically select acceleration or deceleration so as to attain the desired speed with safety and rapidity simply by giving directives, for example, in the form of voltage, indicating the rate of acceleration and the desired final speed.

FIGS. 4 and 5 are detailed circuit diagrams of the control systems of FIGS. 2 and 3, respectively, illustrating the use of magnetic operational amplifiers. Reference numeral 13 indicates speed detecting means such as a pilot generator. In these figures, magnetic operational amplifiers are each indicated by a sector-shaped symbol. Potentiometers $S_1$ and $S_2$ are provided for forming directives $\dot{N}_c$ and $N_c$, respectively. Character V indicates a voltage source for setting the system. Operational resistances and capacitors are indicated by respective standard symbols, as will readily be observed.

One important advantage of employing magnetic operational amplifiers is that the entire control system can be operated at lower voltages and does not include any moving parts. This means that a very stable and hence reliable control system having a practically infinite life of service can be obtained with ease.

It will be appreciated from the foregoing that the present device is valuable for use in various forms of control including the control of a heating or cooling rate as well as the control of acceleration or deceleration.

What is claimed is:

1. An electric circuit device for controlling equipment to a desired amount and rate of variation comprising a first pair of diodes connected in series in the same sense, a second pair of diodes connected in series in the same sense, a pair of junctions connecting said pairs of series-connected diodes in parallel with each other and in the same sense, resistors connected to said respective junctions, means for applying a pair of first signals of opposite polarities to said respective junctions through said respective resistors, said first signals corresponding in magnitude to the desired rate of variation of the equipment to be controlled, means for applying a second signal between said first pair of series-connected diodes which corresponds to the amount of control to be effected on the equipment, and means for driving the equipment in accordance with the difference between said amount of control and a variation rate signal selected according to said amount of control and the rate of variation of the equipment.

2. An electric circuit device for controlling equipment to a desired amount and rate of variation comprising a first pair of diodes connected in series in the same sense, a second pair of diodes connected in series in the same sense, a pair of junctions connecting said pairs of series-connected diodes in parallel with each other, resistors connected to said respective junctions, means for applying a first signal to said junctions in opposite polarities through said respective resistors, said first signal corresponding to the rate of control of the equipment to be controlled, means for applying a second signal between said first pair of series-connected diodes, said second signal corresponding to the amount of control to be effected upon the equipment, means for converting a variation rate signal derived in accordance with said amount of control into a control signal corresponding to the average desired amount of variation, and means for driving the equipment in accordance with the difference between said control signal and the actual value of amount of variation of the equipment.

3. An electric circuit device for automatic control of equipment to a desired amount of variation at the desired rate of variation comprising
- diode bridge means,
- first control means applying first and second signals corresponding to said desired rate of variation but of opposite polarity to said diode means,
- second control means applying a third signal to said diode means for selectively connecting either said first or said second signal to the output of said diode means depending on the amplitude and polarity of said third signal,
- and comparator means for detecting the difference between the desired amount of variation to be reached at said variation rate and the actual amount of variation of the controlled equipment and for controlling the amplitude and polarity of said third signal in accordance with said difference, the output of said diode means being connected in control of said equipment.

4. An electric circuit device for automatic control of equipment to a desired amount of variation at the desired rate of variation comprising
- diode bridge means,
- first control means applying first and second signals corresponding to said desired rate of variation but of opposite polarity to said diode means,
- second control means applying a third signal to said diode means for selectively connecting either said first or said second signal to the output of said diode means depending on the amplitude and polarity of said third signal,
- and comparator means for detecting the difference between the desired amount of variation to be reached at said variation rate and the actual amount of variation of the controlled equipment and for controlling the amplitude and polarity of said third signal in accordance with said difference,
- actuator means for controlling said equipment in response to the output of said diode bridge means including further comparator means for detecting the difference between the desired rate of variation represented by the output of said diode bridge means and the actual rate of variation of the controlled equipment and for controlling the variation of said equipment in accordance with said difference.

5. An electric circuit device for automatic control of equipment to a desired amount of variation at the desired rate of variation comprising
- diode bridge means,
- first control means applying first and second signals corresponding to said desired rate of variation but of opposite polarity to said diode means,
- second control means applying a third signal to said diode means for selectively connecting either said first or said second signal to the output of said diode means depending on the amplitude and polarity of said third signal,
- and comparator means for detecting the difference between the desired amount of variation to be reached at said variation rate and the actual amount of variation of the controlled equipment and for controlling the amplitude and polarity of said third signal in accordance with said difference,
- actuator means for controlling said equipment in response to the output of said diode bridge means including further comparator means for detecting the difference between the desired rate of variation represented by the output of said diode bridge means and the actual rate of variation of the controlled equipment and for controlling the variation of said equipment in accordance with said difference,
- said actuator means further including means connected to said equipment and said further comparator means for producing a signal corresponding to the actual rate of variation as determined from the actual amount of variation.

6. An electric circuit device for automatic control of equipment to a desired amount of variation at the desired rate of variation comprising
- diode bridge means,
- first control means applying first and second signals corresponding to said desired rate of variation but of opposite polarity to said diode means,
- second control means applying a third signal to said diode means for selectively connecting either said first or said second signal to the output of said diode means depending on the amplitude and polarity of said third signal,
- and comparator means for detecting the difference between the desired amount of variation to be reached at said variation rate and the actual amount of variation of the controlled equipment and for controlling the amplitude and polarity of said third signal in accordance with said difference, actuator means for controlling said equipment in response to the output of said diode bridge means including further comparator means for detecting the difference between the desired rate of variation represented by the output of said diode bridge means and the actual rate of variation of the controlled equipment and for controlling the variation of said equipment in accordance with said difference, said actuator means further including means connected between said diode bridge means and said further comparator means for producing from the output of said diode bridge means a signal corresponding to the desired amount of variation of said equipment and means connected to said equipment and said further comparator means for producing a signal corresponding to the actual amount of variation of said equipment.

7. An electric circuit device for automatic control of equipment to a desired amount of variation at the desired rate of variation comprising diode bridge means, first control means applying first and second signals corresponding to said desired rate of variation but of opposite polarity to said diode means, second control means applying a third signal to said diode means for selectively connecting either said first or said second signal to the output of said diode means depending on the amplitude and polarity of said third signal, and comparator means for detecting the difference between the desired amount of variation to be reached at said variation rate and the actual amount of variation of the controlled equipment and for controlling the amplitude and polarity of said third signal in accordance with said difference, actuator means for controlling said equipment in response to the output of said diode bridge means including further comparator means for detecting the difference between the desired rate of variation represented by the output of said diode bridge means and the actual rate of variation of the controlled equipment and for controlling the variation of said equipment in accordance with said difference, said actuator means further including means connected between said diode bridge means and said further comparator means for producing from the output of said diode bridge means a signal corresponding to the desired amount of variation of said equipment and means connected to said equipment and said further comparator means for producing a signal corresponding to the actual amount of variation of said equipment, said means connected between said diode bridge means and said further comparator means including an integrating circuit.

References Cited by the Examiner

UNITED STATES PATENTS

| | | | |
|---|---|---|---|
| 2,829,251 | 4/1958 | Patton | 328—132 |
| 3,011,129 | 11/1961 | Magleby et al. | 307—88.5 |
| 3,094,629 | 6/1963 | Ostroff et al. | 307—88.5 |
| 3,124,705 | 3/1964 | Gray | 307—88.5 |
| 3,127,554 | 3/1964 | Kaneho | 307—88.5 |
| 3,130,324 | 4/1964 | Swallow | 328—92 |

ARTHUR GAUSS, *Primary Examiner.*

JOHN W. HUCKERT, *Examiner.*